Patented Aug. 22, 1939

2,170,306

UNITED STATES PATENT OFFICE 2,170,306

TREATMENT OF HYDROCARBONS

Vladimir Ipatieff and Herman Pines, Chicago, Ill., assignors to Universal Oil Products Company, Chicago, Ill., a corporation of Delaware No Drawing. Application May 29, 1937, Serial No. 145,570

6 Claims. (Cl. 196—10)

This invention relates to the treatment of paraffin hydrocarbons which are gaseous at ordinary temperatures and pressures, particularly isobutane.

In a more specific sense, the invention is concerned with a novel process for alkylating isobutane with olefins which are normally gaseous to produce saturated hydrocarbons of higher molecular weight which can be utilized as constituents of motor fuel for automobile and aeroplane engines.

The cracking process which is operated principally with the object of producing gasoline from heavier and less valuable petroleum fractions incidentally produces considerable yields of fixed gases comprising hydrogen, methane, ethane, propane, and butanes as well as ethylene, propylene, and butylenes in varying quantities and proportions. In most instances these gases are considered to have merely a fuel value though attempts are made from time to time to utilize the olefinic constituents for the manufacture of hydrocarbon derivatives on a commercial basis. In one application of the present process the isobutane present in cracked gas mixtures is utilized as a source of additional yields of motor fuel fractions to augment those primarily produced by the cracking operation. While the process is particularly applicable to cracked gas mixtures and particularly selected fractions produced therefrom in the stabilizers of cracking plants, it is also applicable to the treatment of isobutane produced from any other source.

In one specific embodiment the present invention comprises the alkylation of isobutane with n-butylenes at temperatures of 0° C. and below with catalysts comprising essentially aluminum chloride or hydrogen chloride or a mixture of both.

The essential feature of the present invention is the utilization of sufficiently low temperatures of treatment so that the ordinarily vigorous action of aluminum chloride in catalyzing condensation reactions among hydrocarbons is moderated and reactions of alkylation occur rather than simple polymerization of the olefin involved. In other words, at the selected low temperatures employed the rate of the polymerization reactions is not reduced to the same extent so that alkylation takes place in preference to polymerization.

The actual operation of the process admits of some modification depending upon whether batch or continuous operations are employed. In a simple type of batch operation, involving substantially only the pure compounds isobutane and n-butylenes, the isobutane is cooled to 0° C. or lower in the presence of a minor percentage of anhydrous aluminum chloride and alkylation is effected by the gradual introduction of n-butylenes under the surface of the liquid which may be mechanically stirred to prevent subsidence of the solid aluminum chloride particles. A small percentage of hydrogen chloride is admitted along with the stream of olefin vapor. After a treatment is completed the aluminum chloride layer is allowed to settle, and the upper hydrocarbon layer is removed by decantation and subjected to fractionation for the removal of uncombined hydrocarbons as a light overhead and the recovery of an intermediate motor fuel fraction.

In continuous operation liquid isobutane containing suspended therein the requisite amount of aluminum chloride and cooled to a suitably low temperature may be pumped through a tubular treater at the entrance to which it receives the necessary addition of n-butylenes and hydrogen chloride, the desired alkylation taking place during passage through the treater and the fractionation of the product accomplished in a subsequent fractionator. The details of continuous processes of this general character are more or less familiar to those skilled in oil refinery operations and any necessary additions to or modifications of the above general procedures will be more or less obvious, and can be made without departing from the general scope of the invention.

The present process can be successfully utilized to develop octanes which are largely of an isomeric character from the mixtures of four carbon atom hydrocarbons which are obtainable either by the close fractionation of cracked gas mixtures such as those produced as overhead from cracking plant stabilizers or by utilizing a secondary cut of the overhead from the stabilizers which consists principally of the desired four carbon atom hydrocarbons including isobutylene, normal butylenes, isobutane, and normal butane. In the treatment of such mixtures with condensing catalysts such as aluminum chloride and hydrogen chloride, conditions can be regulated so that the primary reactions involve principally the interaction of the iso compounds and the primary liquid products are those formed by the alkylation of isobutane with isobutylene. Thereafter, conditions can be changed in respect to temperature, percentage of catalyst and time of contact so that still more octanes are formed by the alkylation of isobutane with n-butylenes.

It is comprised within the scope of the present invention, however, to preliminarily prepare isobutane and normal butylenes by any type of process and subsequently react these compounds under the preferred low temperature conditions and in the presence of the preferred catalyst.

One type of operation which is readily adaptable to use in the present connection consists in introducing proportioned mixtures of isobutane and normal butylenes (or the residual components of the previously mentioned butane-butylene fractions after preliminary removal of isobutylene either by selective polymerization or alkylation of some isobutane with isobutylene) into neutral hydrocarbon solvents such as hexane or cyclohexane in which the aluminum chloride catalyst is maintained in suspension, and into which the requisite small amount of hydrogen chloride is either passed separately or in admixture with the entering gas stream. Since the reaction products are principally octanes they are readily separable from the liquid hydrocarbon layer by subsequent fractionation.

As already intimated, the present invention comprises the alkylation of isobutane with normal butylenes wherein these compounds are present in varying proportions or admixed with other gases which are substantially unreactive under properly chosen operating conditions. Over the preferred low temperature conditions of operation it is most usual for one molecule of a normal butylene to react with its molecular equivalent of isobutane while the excess of either hydrocarbon remains unaffected. In order to balance up any deficiency on the side of either the olefin or the paraffin, either may be added from outside sources to effect the complete removal of the hydrocarbon of opposite characteristic from the standpoint of saturation.

The process may be utilized for the direct improvement of low antiknock value gasoline by suspending aluminum chloride therein at the required low temperatures and passing proportioned mixtures of isobutane and normal butylenes into the suspension along with a trace of hydrogen chloride. The gasoline functions both as a solvent and a reaction medium and the alkylation products are formed and blended with the gasoline at the same time to increase its antiknock value to an extent depending upon the amount of alkylated products formed.

The following examples are given as illustrative of the type of results normally obtainable by the use of the present process, although they are not given with the intention of limiting the scope of the invention in exact conformity with the data presented.

*Example I*

A series of runs was made in which the factors of the ratio of isobutane to normal butylenes was varied slightly and also the time of contact with the granular aluminum chloride catalyst. In the type of operation employed a fixed amount of granular aluminum chloride was placed in the bottom of a cylindrical vessel and the liquefied mixture of isobutane and normal butylenes was passed directly into contact with the catalyst, with vigorous agitation to insure intimate contact, and a level of liquid was maintained by a siphon arrangement which removed the liquid as produced without removing any of the aluminum chloride. A small amount of hydrogen chloride was added continuously during the run. The table below includes the principal data obtained. The temperature employed in all runs was −30° C.

| Percent of isobutane | Percent of n-butylenes | Charging rate* | Yield of 200° C. E. P. gasoline | Ratio isobutane to n-butylenes reacting |
|---|---|---|---|---|
| 80 | 20 | 9 | 75 | 1:2.7 |
| 75 | 25 | 13 | 80 | 1:1.8 |
| 75 | 25 | 20 | 79 | |

*Weight of charge per hour per unit weight of catalyst.

It will be observed from the above figures that the best yield of gasoline boiling range material was obtained with a ratio of three parts isobutane to one part normal butylenes using the intermediate charging rate. Of the total products approximately 45% consisted of mixed octanes and another 20% consisted of dodecanes. The products boiling up to 225° C. showed an octane number of 83 by the motor method of testing.

*Example II*

This is given to illustrate the use of the maximum temperature which has been determined as the limit of the practical operation of the process. To 72 parts by weight of isobutane at 0° C., 20 parts by weight of powdered anhydrous aluminum chloride was added and maintained in suspension by vigorous mechanical agitation. 30 parts by weight of a mixture of normal butylenes cooled to slightly below 0° C. was added gradually to the suspension along with a small amount of hydrogen chloride. Following the completion of the reactions, the lower layer was found to consist of approximately 20 parts by weight and the upper layer of 88 parts by weight of a hydrocarbon fraction which was paraffinic in accordance with its unreactivity with potassium permanganate solutions and nitrating mixture. This fraction was water white and 82% of it boiled below 200° C. The octane number of the gasoline boiling fraction was 84 by the motor method of testing.

The foregoing specifications has disclosed the character and scope of the present invention and the examples have shown its practical aspects but neither section is to be considered as unduly limiting.

We claim as our invention:

1. A process for producing gasoline boiling-range hydrocarbons which comprises alkylating isobutane with n-butylenes in the substantial absence of isobutylene and in the presence of aluminum chloride at temperatures of 0° C. or below.

2. A process for producing gasoline boiling-range hydrocarbons which comprises alkylating isobutane with n-butylenes in the substantial absence of isobutylene and in the presence of aluminum chloride and hydrogen chloride at temperatures of 0° C. or below.

3. A process for producing gasoline boiling-range hydrocarbons from cracked gas mixtures containing isobutylene, isobutane and n-butylenes, which comprises separating the isobutylene from the mixture and subjecting the remainder of the gas mixture to the action of aluminum chloride at temperatures of 0° C. or below, whereby to alkylate the isobutane with the n-butylenes.

4. A process for producing gasoline boiling-range hydrocarbons from cracked gas mixtures containing isobutylene, isobutane and n-butylenes, which comprises separating the isobutylene from the mixture and subjecting the remainder of the gas mixture to the action of aluminum chloride and hydrogen chloride at temperatures of 0° C. or below, whereby to alkylate the isobutane with the n-butylenes.

5. A process for increasing the antiknock value of gasoline which comprises adding aluminum chloride to the gasoline, passing isobutane and n-butylenes into the resultant mixture, maintaining the mixture at temperatures of 0° C. or below, whereby to alkylate the isobutane with the n-butylenes, and recovering the gasoline containing the alkylated derivatives thus formed.

6. A process for increasing the antiknock value of gasoline which comprises adding aluminum chloride to the gasoline, passing hydrogen chloride, isobutane, and n-butylenes into the resultant mixture, maintaining the mixture at temperatures of 0° C. or below, whereby to alkylate the isobutane with the n-butylenes, and recovering the gasoline containing the alkylated derivatives thus formed.

VLADIMIR IPATIEFF.
HERMAN PINES.